US006977610B2

(12) United States Patent
Brookner et al.

(10) Patent No.: US 6,977,610 B2
(45) Date of Patent: Dec. 20, 2005

(54) MULTIPLE RADAR COMBINING FOR INCREASED RANGE, RADAR SENSITIVITY AND ANGLE ACCURACY

(75) Inventors: Eli Brookner, Lexington, MA (US); David V. Manoogian, Lynnfield, MA (US); Fritz Steudel, Sudbury, MA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/684,081

(22) Filed: Oct. 10, 2003

(65) Prior Publication Data

US 2005/0231420 A1  Oct. 20, 2005

(51) Int. Cl.[7] ............................................. G01S 13/72
(52) U.S. Cl. .......................... 342/59; 342/89; 342/90; 342/97; 342/126; 342/145; 342/189; 342/195
(58) Field of Search ............................... 342/59, 89, 90, 342/97, 118, 126, 135, 145, 189, 195

(56) References Cited

U.S. PATENT DOCUMENTS

| 3,731,310 | A | * | 5/1973 | Rittenbach | 342/59 |
| 3,789,397 | A | * | 1/1974 | Evans | 342/59 |
| 3,828,349 | A |  | 8/1974 | Laurenceau |  |
| 3,939,474 | A | * | 2/1976 | Coleman et al. | 342/161 |
| 4,163,974 | A |  | 8/1979 | Profera |  |
| 4,347,513 | A | * | 8/1982 | Schindler | 342/13 |
| 4,649,389 | A |  | 3/1987 | Taylor et al. |  |
| 4,649,390 | A |  | 3/1987 | Andrews et al. |  |
| 4,720,711 | A |  | 1/1988 | Quesinberry et al. |  |
| 4,720,712 | A |  | 1/1988 | Brookner et al. |  |
| 4,743,907 | A | * | 5/1988 | Gellekink | 342/59 |
| 4,766,437 | A |  | 8/1988 | Schmidt et al. |  |
| 4,914,441 | A | * | 4/1990 | Brookner | 342/161 |
| 5,014,061 | A | * | 5/1991 | Ghose | 342/45 |
| 5,173,706 | A |  | 12/1992 | Urkowitz |  |
| 5,302,955 | A | * | 4/1994 | Schutte et al. | 342/59 |
| 5,442,359 | A |  | 8/1995 | Rubin |  |
| 5,448,243 | A | * | 9/1995 | Bethke et al. | 342/59 |
| 5,557,282 | A |  | 9/1996 | Mertens |  |
| 5,592,178 | A |  | 1/1997 | Chang et al. |  |
| 5,917,442 | A |  | 6/1999 | Manoogian |  |

(Continued)

FOREIGN PATENT DOCUMENTS

DE          44 07 369 A1       9/1995

(Continued)

OTHER PUBLICATIONS

"Netted radar sensing", Baker, C.J.; Hume, A.L.; Aerospace and Electronic Systems Magazine, IEEE, vol.: 18, Issue: 2, Feb. 2003 pp. 3-6.*

(Continued)

Primary Examiner—John B. Sotomayor
(74) Attorney, Agent, or Firm—Daly, Crowley, Mofford & Durkee, LLP

(57) ABSTRACT

A mechanism for combining signals of multiple radars to achieve increased range, radar sensitivity and angle accuracy is provided. A first signal beam is radiated from an antenna of a first radar in the direction of a target. A second signal beam is radiated from an antenna of a second radar in the direction of the same target. The echo signals from the first signal beam and the second signal beam are received at both radars. The echo signals received at the first radar are processed to produce first radar processed echo signals and the echoes signals received at the second radar are processed to produce second radar processed echo signals. The first and second radar processed echo signals are combined to form an aggregate value.

24 Claims, 5 Drawing Sheets

U.S. PATENT DOCUMENTS

| | | | |
|---|---|---|---|
| 6,078,289 | A | 6/2000 | Manoogian et al. |
| 6,104,343 | A | 8/2000 | Brookner et al. |
| 6,122,040 | A * | 9/2000 | Arita et al. ............... 356/4.01 |
| 6,169,518 | B1 | 1/2001 | Nelson et al. |
| 6,218,979 | B1 | 4/2001 | Barnes et al. |
| 6,232,920 | B1 | 5/2001 | Brookner et al. |
| 6,362,774 | B1 * | 3/2002 | Green ......................... 342/59 |
| 6,538,597 | B1 | 3/2003 | Steudel |
| 6,630,902 | B1 | 10/2003 | Fenton et al. |
| 2002/0060639 | A1 | 5/2002 | Harman |
| 2003/0078730 | A1 * | 4/2003 | Sekiguchi ................... 701/301 |
| 2003/0088361 | A1 * | 5/2003 | Sekiguchi ................... 701/301 |
| 2003/0097237 | A1 * | 5/2003 | Sekiguchi ................... 702/158 |
| 2004/0054473 | A1 * | 3/2004 | Shimomura ................. 701/301 |
| 2004/0080449 | A1 * | 4/2004 | Horibe ........................ 342/70 |

FOREIGN PATENT DOCUMENTS

| | | |
|---|---|---|
| EP | 0 509 843 A2 | 10/1992 |
| EP | 0 509 843 A3 | 10/1992 |
| EP | 0 851 238 A2 | 7/1998 |
| EP | 0 851 238 A3 | 7/1998 |

OTHER PUBLICATIONS

"Focusing of the spatially separated adaptive antenna arrays on multiple radiation sources by method of correlation identificatio of the bearings", Sedyshev, Yu.N et al.; Ant. Theory and Techs, 2003. IVth Int'l Conf. on, vol.: 1, Sep. 9-12, 2003 pp. 42-46.*

PCT Search, PCT/US2004/019056; dated Oct. 13, 2004 (DCMD Case No. RTN-175PUS).

Partial PCT Search Report; PCT/US2004/032065; dated Feb. 24, 2005 (DCMD Case No. RTN-177PUS).

Brookner, "Efficient Technique for Estimating Elevation Angle When Using a Broad Beam for Search in a Radar," U.S. Appl. No. 10/683,507; filed Oct. 10, 2003.

Steudel; "An Improved Process for Phase-Derived Range Measurements;" U.S. Appl. No. 10/627,436; filed Jul. 25, 2003.

PCT Search Report; PCT/US2004/032247; dated Feb. 22, 2005.

* cited by examiner

| Mode | Carrier Frequencies for Radar 1 ($f_1$) and Radar 2 ($f_2$) | Coherent or Incoherent on Transmit | Receiver Processing of $S_{11}$, $S_{12}$ and $S_{21}$, $S_{22}$ | How Waveforms Transmitted | Type of Target | SNR Sensitivity Improvement (dB) |
|---|---|---|---|---|---|---|
| Search/Track | $f_1 \neq f_2$ | Incoherent | Incoherent (as shown in FIG. 1) | Simultaneously | Non-fluctuating | ~6 |
| Search/Track | $f_1 \neq f_2$ | Incoherent | Coherent + Incoherent (as shown in FIG. 3) | Simultaneously | Non-fluctuating | ~6 |
| Track | $f_1 = f_2$ | Coherent | Coherent | Simultaneously | Non-fluctuating | ~9 |
| Track | $f_1 = f_2$ | Coherent | Coherent + Incoherent | Simultaneously | Non-fluctuating | ~9 |
| Search/Track | $f_1 = f_2$ | Incoherent | Incoherent | Sequentially | Non-fluctuating | ~6 |
| Search/Track | $f_1 = f_2$ | Incoherent | Coherent + Incoherent | Sequentially | Non-fluctuating | ~6 |
| Search/Track | $f_1 \neq f_2$ | Incoherent | Incoherent | Simultaneously | Swerling-II | 8.7 |

MULTIPLE RADAR COMBINING FOR INCREASED RANGE, RADAR SENSITIVITY AND ANGLE ACCURACY

BACKGROUND

The invention relates generally to radar, and more particularly, to radar systems having multiple antennas.

In the field of radar systems technology, there continues to be a need for improved capability to handle potential lower cross section as well as longer range targets. In the past, this need has been met by developing larger, more sensitive (and thus more costly) radars.

SUMMARY

The present invention features a technique for combining multiple radars for increased sensitivity and range.

In one aspect, therefore, a method of radar processing includes: radiating a first signal beam from an antenna of a first radar in the direction of a target; radiating a second signal beam from an antenna of a second radar in the direction of the target; receiving echo signals from the first signal beam at the first and second radars; receiving echo signals from the second signal beam at the first and second radars; processing the echo signals received at the first radar to produce first radar processed echo signals; processing the echo signals received at the second radar to produce second radar processed echo signals; and combining the first and second radar processed echo signals to form an aggregate value.

Particular implementations of the invention may provide one or more of the following advantages. The present invention addresses a need for increased range and sensitivity to handle lower cross section and longer range targets as they appear in the future without having to build larger radars for them in the near term. The increased sensitivity is achieved by combining low sensitivity, lower cost radars with minor modification to achieve the higher sensitivity and increased range.

Other features and advantages of the invention will be apparent from the following detailed description and from the claims.

BRIEF DESCRIPTION OF THE DRAWINGS

FIG. 5 is a table that shows sensitivity improvement for search and tracking modes based on different techniques of combining two radars.

Like reference numerals will be used to represent like elements.

DETAILED DESCRIPTION

Figure 1A:
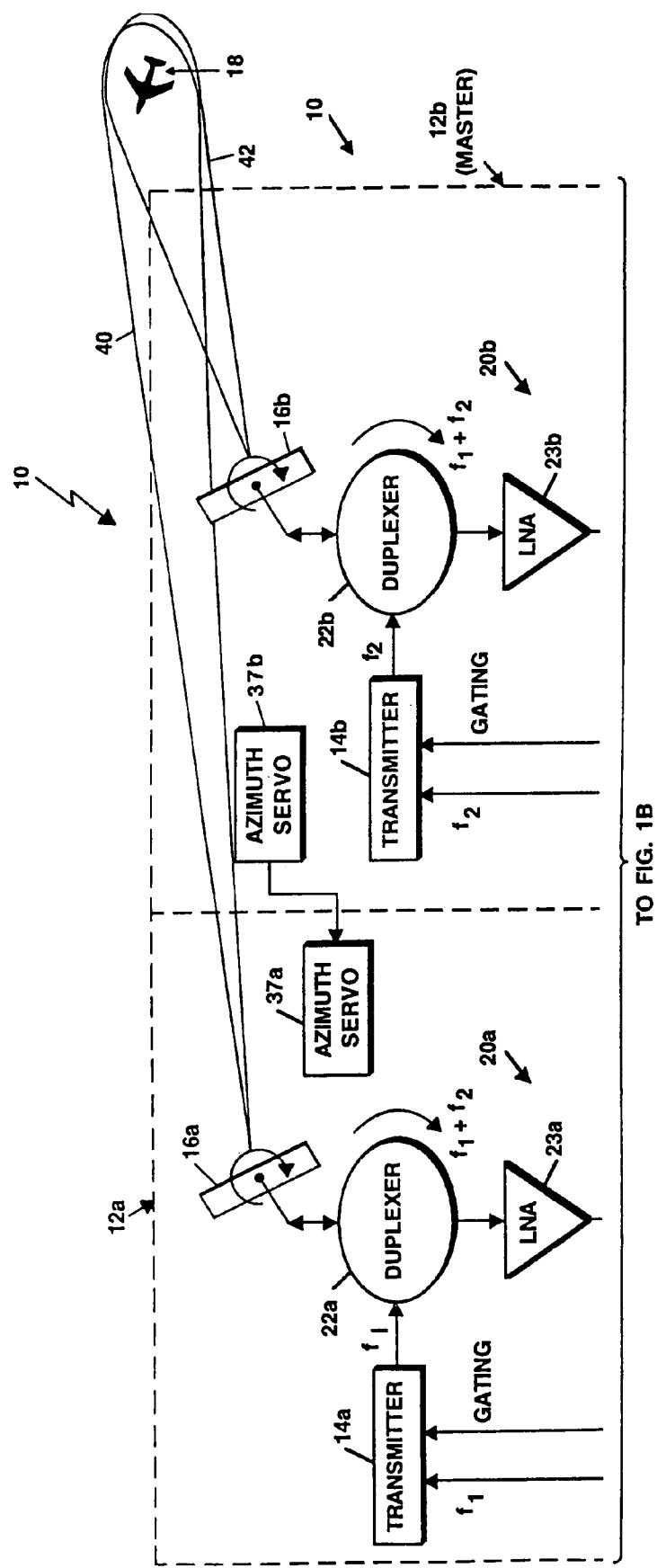
FIGS. 1A and 1B taken together area block diagram of a multi-radar combining system.

Referring to FIG. 1, a multi-radar combining system 10 that combines radars to achieve enhanced capability, in particular, increased range and sensitivity, is shown. The system 10 includes multiple radars 12, shown in the illustrated embodiment as two radars 12a and 12b. Here radar 12b is the "master", although the roles could be reversed. The radars 12a and 12b each include a transmitter, shown as transmitter 14a and transmitter 14b, respectively. The outputs of the transmitters 14a and 14b are delivered to respective antennas 16a, 16b for radiation in the form of a transmit beam directed at a target (indicated by reference numeral 18). In the illustrated embodiment, the antennas 16a, 16b are rotating antennas; however, a stationary antenna could also be used. The antennas 16a, 16b collect echo signals received from the target, and the echo signals (which may be combined into monopulse receive signals) are processed by respective receivers 20a, 20b to detect the presence of the target and determine its location in range and in angle. In radar 12a, a duplexer 22a coupled to the transmitter 14a, receiver 20a and antenna 16a allows the antenna 16a to be used on a time-shared basis for both transmitting and receiving. A duplexer 22b, coupled to the transmitter 14b, receiver 20b and antenna 16b, provides the same functionality (as duplexer 22a) in radar 12b.

Still referring to FIG. 1, the receivers 20a and 20b include a low-noise amplifier ("LNA") 23a and a LNA 23b, respectively. The LNA 23a (of receiver 20a) is coupled to down converters 24a-1 and 24a-2, and the LNA 23b (of receiver 20b) is coupled to down converters 24b-1 and 24b-2. The down converters 24a-1, 24a-2, 24b-1 and 24b-2 (more generally, down converters 24) perform RF-to-IF conversion. Each of the receivers includes a receiver exciter ("REX"), a REX 25a in receiver 20a and a REX 25b in receiver 20b. The REX 25b of the master radar 12b (master REX) provides both transmit carrier frequencies $f_1$ and $f_2$, with their modulations, and local oscillator signals $LO_1$ and $LO_2$ (indicated collectively by reference numeral 26), to radars 12a and 12b. In the example shown, with radar 12b serving as the master radar, REX 25a of radar 12a is in "by-pass" mode, that is, it does not operate as a REX but merely distributes within radar 12a the signals generated by REX 25b. In receiver 20a, the down converter 24a-1 and the down converter 24a-2 are connected to a signal processor 27a-1 and a signal processor 27a-2, respectively. In receiver 20b, the down converter 24b-1 and the down converter 24b-2 are connected to a signal processor 27b-1 and a signal processor 27b-2, respectively. The signal processors 27a-1, 27a-2, 27b-1 and 27b-2 (generally, signal processors 27) perform filtering, possibly including pulse compression filtering. The signal processors 27 are further connected to envelope detectors, more specifically, signal processor 27a-1 and signal processor 27a-2 are connected to envelope detector 28a-1 and envelope detector 28a-2, respectively, while signal processor 27b-1 and signal processor 27b-2 are connected to envelope detector 28b-1 and envelope detector 28b-2, respectively. The four envelope detected signals are added (video integrated) by a combiner 30 and passed to a threshold detector 32 for detection. The threshold detector 32 is coupled to and provides detection information to other conventional radar system elements, e.g., a tracker 34 and a display 36, as shown.

As indicated above, system 10 combines receive signals of radars 12a, 12b in a manner that achieves greater sensitivity gain and increased range. Referring now to FIG. 2 in conjunction with FIG. 1, the radars 12a, 12b to be combined are positioned in fairly close proximity to each other. The phase centers of the antenna 16a and the antenna 16b (in radar 12a and radar 12b, respectively), are spaced by a distance "D". The distance D is a flexible parameter. A small value for D may be selected to simplify the processing of the echo signals. If a larger distance is chosen, delays may be needed so that the echo signals can be added correctly (to within a fraction of a pulse width) during processing. Also, if coherent integration is used ($f_1=f_2$), the effects of interferometric lobing become a concern when there is too much spacing between the radars. If the distance D is somewhat larger than the width "W" of the antenna 16, then a large interferometer baseline is formed when coherent combining on receive is used (as discussed shortly), with the result that the angle accuracy will be improved, in some cases by an order of magnitude.

Referring again to FIG. 1, the rotation of the antennas of the multiple radars are synchronized by a synchronization signal provided by an azimuth servo 37b (in radar 12b) to an azimuth servo 37a (in radar 12a) so that the beams of the radars look in the same direction, to within a fraction of a beamwidth. The radars nominally radiate identical transmit signal beams (e.g., beams 40 and 42 for radars 12a and 12b, respectively) at the same time. The beams could, however, be different. The carrier frequencies $f_1$ and $f_2$ are different where incoherent transmit operation and incoherent receiver combining is used. The carrier frequencies $f_1$ and $f_2$ will be the same if coherent transmit operation and coherent receiver combining for all signals is desired, as discussed later. When the carrier frequencies $f_1$ and $f_2$ are different, they may differ sufficiently so that they do not interfere with each other and can be separated from each other in the radar receivers, yet are close enough to allow the same phase shift commands for a phased array antenna. Also, they may differ sufficiently to provide frequency diversity, i.e., the echo amplitudes are then independent at the two frequencies. In addition, the use of different carrier frequencies helps to avoid interferometric lobing, which is not desirable during search (and may not be desirable for tracking, either, if the radars are too far apart). The echoes of the transmitted signals from both radars are received by both radars.

FIG. 2 shows the path of the echo signals for both radars. Still referring to FIGS. 1 and 2, echoes from a transmit beam radiated by the antenna of radar 12a towards the target 18 are received at radar 12a, as indicated by reference numeral 50a (echo signals "$e_{11}$"), and are received at radar 12b, as indicated by reference numeral 50b (echo signals "$e_{12}$"). Similarly, the echoes of the transmitted signal from radar 12b are received at radar 12a, as indicated by reference numeral 52a (echo signals "$e_{21}$"), and are received at radar 12b, as indicated by reference number 52b (echo signals "$e_{22}$"). These four echoes 50a, 50b, 52a, 52b, are pulse compressed and pulse Doppler processed (if appropriate) in the appropriate signal processors 27 to produce processed echo signals $s_{11}$ 54a, $s_{12}$ 54b, $s_{21}$ 56a, $s_{22}$ 56b, respectively, as shown in FIG. 1. The four processed echoes are then envelope detected and video integrated to produce video integrated signals $v_{11}$ 157a, $v_{12}$ 57b, $v_{21}$ 58a and $v_{22}$ 58b, respectively. These four signals are combined to produce an aggregate value 59. It will be understood from the figure that the receiver of radar 12a handles the processing of signals $e_{11}$ 50a and $e_{21}$ 52a to produce $v_{11}$ 57a and $v_{21}$ 58a, respectively, while the receiver of radar 12b handles the processing of signals $e_{12}$ 50b and $e_{22}$ 52b to produce $v_{12}$ 57b and $v_{22}$ 58b, respectively.

Figure 3:
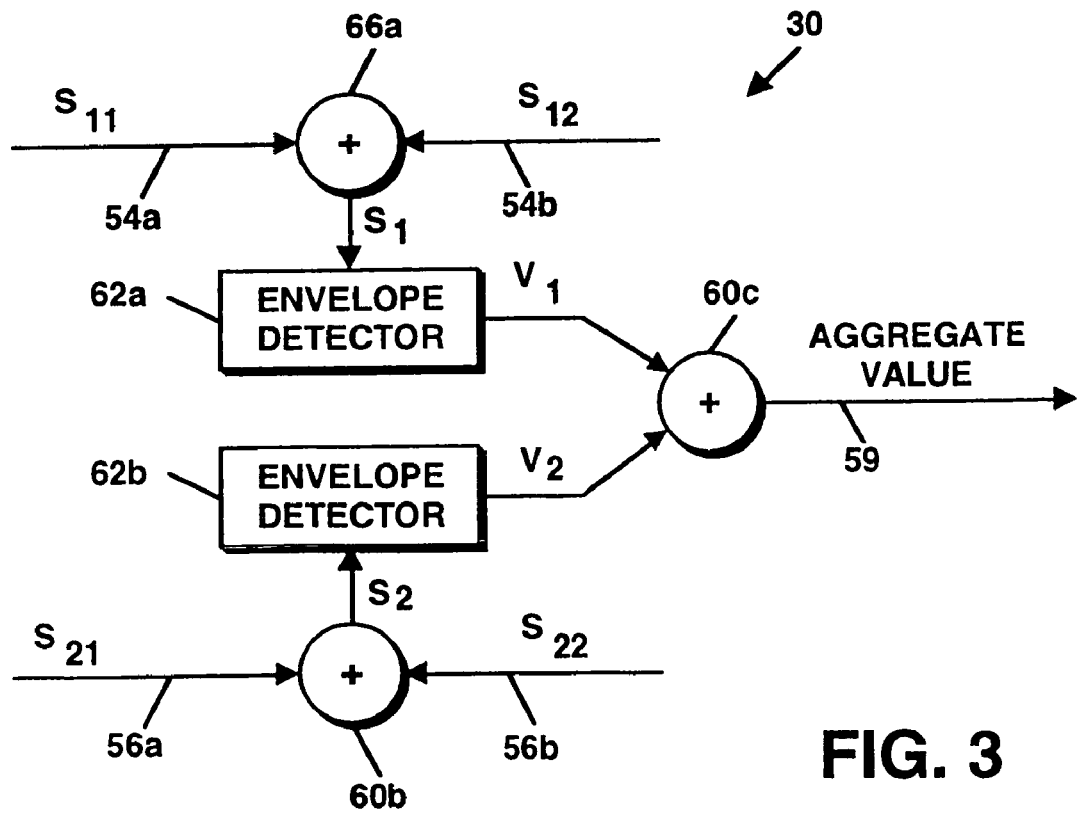
FIG. 3 is a block diagram of a portion of the system modified to combine coherently the echo signals for the same carrier frequency and combine the results (different carrier frequencies) using video integration.

In the embodiment illustrated in FIG. 1, the four echoes are combined incoherently in the radar receiver. Other techniques may be used to combine the echo signals as well. One example is shown in FIG. 3. Referring to FIG. 3, the combiner 30 of the receiver is suitably adapted to allow the processed signals having the same carrier frequency, e.g., $s_{11}$ and $s_{12}$, to be added coherently. Thus, $s_{11}$ and $s_{12}$ can be added coherently by a first adder 60a, and $s_{21}$ and $s_{22}$ can be added coherently by a second adder 60b. The resulting sum signals $s_{11}+s_{12}$ ("$S_1$") and $s_{21}+s_{22}$ ("$S_{22}$") each are envelope detected by respective envelope detectors 62a, 62b. The envelope detected values $v_1$ and $v_2$ are combined by a third adder 60c to form the final, aggregate value 59.

Generally, for the search mode, it is found that coherent addition of the type described with reference to FIG. 3 does not provide any significant improvement in detectability over video integration (incoherent addition). This is the case because the phases of processed echo signals $s_{11}$ and $s_{12}$ (and $s_{21}$ and $s_{22}$) are not known, and so the signals have to be added with a bank of adders having different relative phase shifts, as will be described shortly. For the track mode, coherent addition can provide better SNR.

The processed echo signals may be combined using different techniques when the carrier frequencies $f_1$ and $f_2$ are equal as well. For example, the four processed echo signals may be combined coherently (track mode), or using a combination of coherent and incoherent integration (for track or search mode also). When $f_1=f_2$, it is only necessary to have one mixer per radar. In the illustrated embodiment of FIG. 1, for the case of $f_1=f_2$, only one pair of mixers, for example, 24a-1 and 24b-1 (or, alternatively, 24a-2 and 24b-2), need be used. As discussed later, $f_1$ would be set equal to $f_2$ generally for a track mode only.

The potential advantage of using coherent integration is that of providing improved sensitivity (about another 3 dB to about 9 dB) for the track mode. This improved sensitivity is realized because of the coherent addition that can result in beams from radars 12a and 12b at the target for $f_1=f_2$ when the signals from radars 12a and 12b are transmitted simultaneously. An interferometric pattern is produced on transmit. If the phase centers of the two radars are not known to a fraction of a wavelength, then more than one simultaneous transmission of the signals from radars 12a and 12b will be needed with different relative phase shifts between the signals for each transmission to ensure coherent addition at the target (or worded differently, to ensure that the target is near the peak of transmit interferometric peak). First a 0° relative phase shift would be tried. If the target is not detected (or the SNR is not as large as expected), then a 180° relative phase shift would be used. If the target is still not detected (or the SNR not large enough), a 90° relative phase shift could be used, followed finally by a 270° relative phase shift.

On receive, because the phases of the signals out of the radars 12a and 12b will not generally be known, the coherent combining will be performed using a bank of parallel channels each adding the two signals with a different relative phase shift. For example, eight phase shifts from 0° to 315° in steps of 45° could be used. After the best relative phase shift for receive was determined out of the eight possible phase shifts, the signals could be reprocessed with smaller phase steps to determine which gives the best SNR, so as to eventually achieve 9 dB improvement in SNR over that obtained with one radar in the track mode.

If the phase centers of the two radars were known to a fraction of a wavelength, it would not be necessary to use multiple transmissions with different phase shifts to get the signals from the two radars to add coherently at the target, i.e., to put a transmit interferometric lobe on the target. Instead, the phase shift needed to put a transmit and receive interferometric lobe on the target would be determined from knowledge of the location of the target to a fraction of a beamwidth. The target angle determination is obtained from the normal monopulse channel signals from the radars operated with $f_1 \neq f_2$. In this case, the standard monopulse outputs of radars 12a and 12b would be processed in the same way as described above (with reference to FIG. 3) for the sum signal outputs, but now to estimate the target angle. The coherent addition on transmit and receive can be further improved if defined by using the initial phase shifts for transmit and receive obtained from the monopulse measurements and then searching for better phase shifts for transmit and receive.

With $f_1=f_2$ it is possible to avoid having an interferometric pattern on transmit by transmitting the signals from radars 12 and 12b sequentially in time so as not to overlap in time on transmit or receive. The echo signals can then be added incoherently when appropriately delayed on receive. The sequential transmissions eliminate the need for two receivers in each radar. The improvement in sensitivity achieved with this technique is about 6 dB.

Once the target is detected, it is possible to estimate that target's azimuth (or elevation) angle very accurately. For $f_1 \neq f_2$, it is possible to determine the target's location in angle to a fraction of a receive interferometric lobe width. This determination can be made by measuring the phase of $s_{11}$ relative to $s_{12}$ and, likewise, $s_{21}$ relative to $s_{22}$. Knowing these phases provides a very accurate estimate of the target angle, specifically to a fraction of a receive interferometric lobe width, which is much narrower than the width of the beams of each radar. The ambiguity as to which lobe the target is on is eliminated by using a normal monopulse measurement obtained with $f_1 \neq f_2$ as described above.

For $f_1=f_2$, the target angle is estimated accurately by measuring the phase between the signals out of receivers 22a and 22b independent of whether the signals are transmitted from radars 12a and 12b simultaneously or sequentially.

Other implementations of the radars 12a, 12b are possible. While the block diagram of FIG. 1 is intended to be conceptual in nature, it depicts an all analog implementation for the radars 12a, 12b. It will be understood, however, that the radar receiver can be designed for digital signal processing, as shown in FIG. 4.

Figure 4:
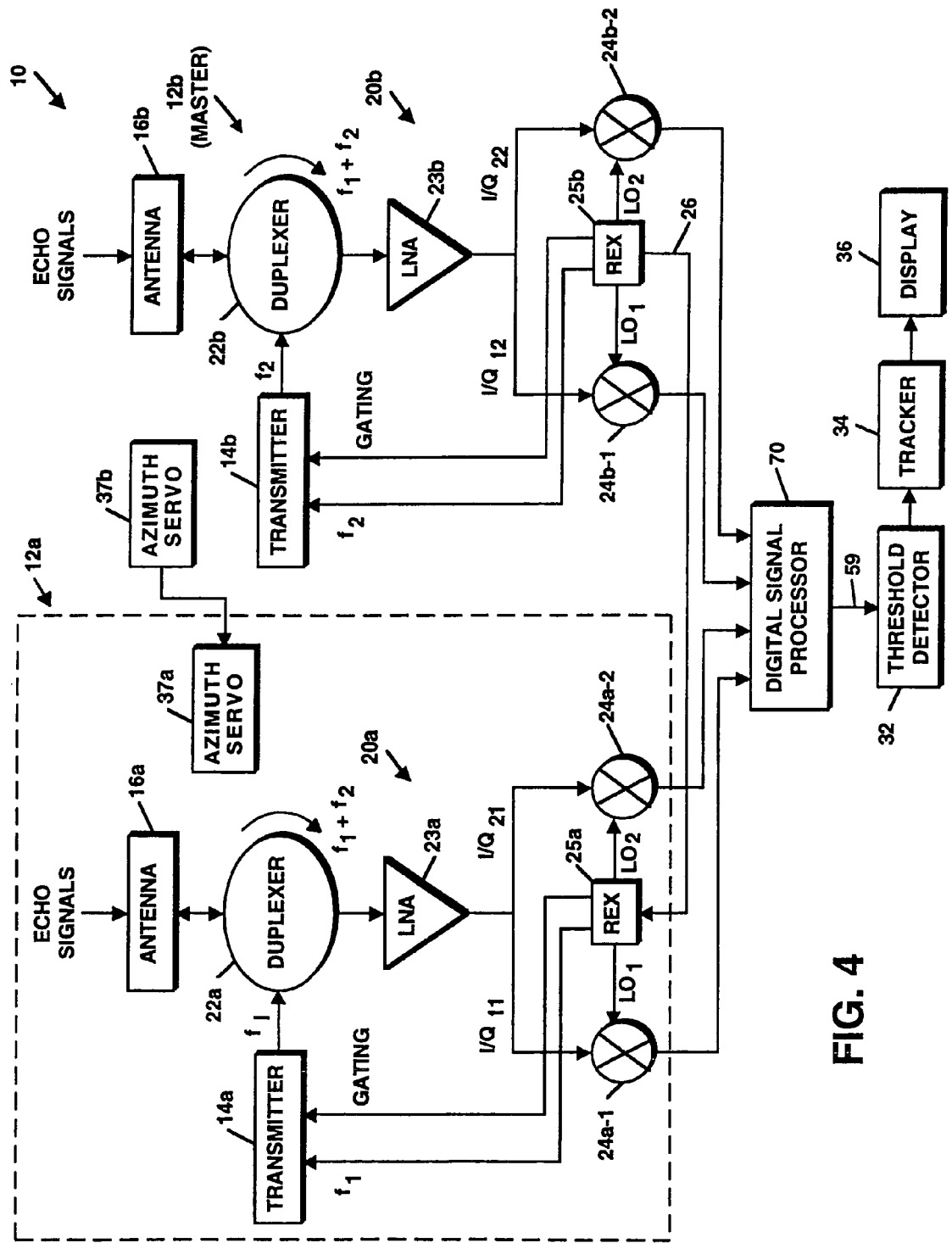
FIG. 4 is a block diagram of an exemplary digital implementation of the multi-radar combining system.

Referring now to FIG. 4, the system 10 includes a digital signal processor 70 that receives echo signals from each of the down converters 24. In the exemplary digital processing implementation of FIG. 4, the signals correspond to in-phase ("I") and quadrature ("Q") channels. The digital signal processor 70 performs digitally those functions performed by units 27, 28 and 30 of system 10 as depicted in FIG. 1. The output of the digital signal processor 70, that is, the aggregate value, can be provided to threshold detector 32, as before.

Although the digital signal processor 70, like the units 27, 28 and 30, can be separate from the radars 12a, 12b, this circuitry could reside in one or both of the radars. If included in both radars, only the digital signal processor 70 in one radar operating as the master would be used during operation. The same can be said of the threshold detect 32, tracker 34 and display 36. In FIG. 4, as in FIG. 1, radar 12b is represented as the master. Any digital signal processing, threshold detect, tracking and display capability in radar 12a, to the extent that it may exist, has been omitted from the figure for simplification.

While only two radars are shown in the system examples of FIGS. 1 and 4, it will be appreciated that the multi-radar combining concept embodied therein can be extended to more than two radars. Also, although the radars 12a, 12b are described as rotating antennas, the technique described herein also applies to radars that use non-rotating phased arrays.

FIG. 5 shows a table that provides the Signal-to-Noise Ratio (SNR) sensitivity improvement (in dB) for different techniques of combining two radars. For a non-fluctuating target, the sensitivity gain of the combined radars (relative to a single radar) is approximately 6 dB for searches regardless of whether coherent or incoherent integration is used (on transmit and/or receive). For track mode, when coherent integration is used on transmit and the frequency is the same for both radars (that is, $f_1=f_2$), the strength of the signal on the target is greater by 3 dB so that the SNR is now 3 dB higher for a total gain of 9 dB over that for a single target.

For the case of a fluctuating target (Swerling-II type), it is assumed that the two radars being combined as described above use carrier frequencies that differ sufficiently to provide frequency diversity. For a single look Pd of 90%, therefore, the resultant increase in sensitivity is 8.7 dB better than that of a single radar that does not use frequency diversity.

Other embodiments are within the scope of the following claims.

What is claimed is:

1. A method of radar processing comprising:
   radiating a first signal beam from an antenna of a first radar in the direction of a target;
   radiating a second signal beam from an antenna of a second radar in the direction of the target;
   receiving echo signals from the first signal beam at the first and second radars;
   receiving echo signals from the second signal beam at the first and second radars;
   processing the echo signals received at the first radar to produce first radar processed echo signals;
   processing the echo signals received at the second radar to produce second radar processed echo signals; and
   combining the first and second radar processed echo signal values to form an aggregate value.

2. The method of claim 1 wherein the first and second signal beams have respective first and second carrier frequencies which are different.

3. The method of claim 2 wherein combining comprises combining incoherently all of the first and second radar processed echo signals.

4. The method of claim 2 wherein combining comprises:
   combining coherently those of the first and second radar processed echo signals that have the first carrier frequency;
   combining coherently those of the first and second radar processed echo signals that have the second carrier frequency; and
   combining incoherently the results of the coherent combination for the first and second carrier frequencies.

5. The method of claim 1 wherein the first and second signal beams have the same carrier frequency.

6. The method of claim 5 wherein combining comprises:
   combining coherently those of the first and second radar processed echo signals from the first signal beam to produce a first result;
   combining coherently those of the first and second radar processed echo signals from the second signal beam to produce a second result; and
   combining coherently the first and second results.

7. The method of claim 5 wherein combining comprises:
combining coherently those of the first and second radar processed echo signals from the first signal beam to produce a first result;
combining coherently those of the first and second radar processed echo signals from the second signal beam to produce a second result; and
combining incoherently the first and second results.

8. The method of claim 5 wherein combining comprises:
combining incoherently those of the first and second radar processed echo signals from the first signal beam to produce a first result;
combining incoherently those of the first and second radar processed echo signals from the second signal beam to produce a second result; and
combining incoherently the first and second results.

9. The method of claim 8 wherein the first and second signal beams are transmitted sequentially in time.

10. The method of claim 1 wherein the antennas are synchronized rotating antennas.

11. The method of claim 1 wherein the antennas comprise non-rotating phased arrays.

12. A method of processing radar signals comprising:
radiating a first signal beam by a first radar with the first signal beam being radiated in the direction of a target;
receiving, in the first radar, echo signals from the first signal beam;
receiving, in the first radar, echo signals from a second signal beam radiated by a second different radar radiating the second signal beam in the direction of the target, the first radar and the second radar being spaced a predetermined distance apart; and
processing, in the first radar, the echo signals from the first and second signal beams to provide first-radar processed echo signals.

13. The method of claim 12 further comprising:
receiving, in the second radar, echo signals from the first signal beam;
receiving, in the second radar echo signals from the second signal beam;
processing, in the second radar, the echo signals from the first and second signal beams to provide second-radar processed echo signals; and
combining the second-radar processed echo signals with the first-radar echo signals to form an aggregate value.

14. A radar comprising:
a transmitter which provide signals to and antenna to radiate a first signal in the direction of a target;
a receiver to receive echo signals from the first signal beam and echo signals from a second signal beam radiated in the direction of the target by a second antenna of a second radar; and
circuitry to process the echo signals from the first and second signal beams received by the receiver, and to combine the processed echo signals with echo signals from the first and second signal beams that have been received by a receiver of the second radar and processed, to form an aggregate value.

15. The radar of claim 14 wherein the circuitry comprises a digital signal processor.

16. The radar of claim 14 wherein the circuitry comprises analog circuitry.

17. The radar of claim 14 further including circuitry to synchronize rotation of the antenna with the second antenna of the second radar.

18. The radar of claim 14 wherein the first and second signal beams have respective first and second carrier frequencies which are different.

19. The radar of claim 18 wherein the circuitry combines the processed echo signals using incoherent integration.

20. The radar of claim 18 wherein the circuitry combines the processed echo signals using both coherent and incoherent integration.

21. The radar of claim 14 wherein the first and second signal beams have respective first and second carrier frequencies which are the same.

22. The radar of claim 21 where the circuitry combines the processed echo signals using coherent integration.

23. The radar of claim 21 wherein the circuitry combines the processed echo signals using incoherent integration.

24. The radar of claim 21 wherein the circuitry combines the processed echo signals using both coherent and incoherent integration.

* * * * *

UNITED STATES PATENT AND TRADEMARK OFFICE
CERTIFICATE OF CORRECTION

PATENT NO. : 6,977,610 B2
APPLICATION NO. : 10/684081
DATED : December 20, 2005
INVENTOR(S) : Eli Brookner et al.

It is certified that error appears in the above-identified patent and that said Letters Patent is hereby corrected as shown below:

Title page,
Item [57], ABSTRACT,
Line 10, delete "the echoes signals" and replace with -- the echo signals --.

Figure 1B:
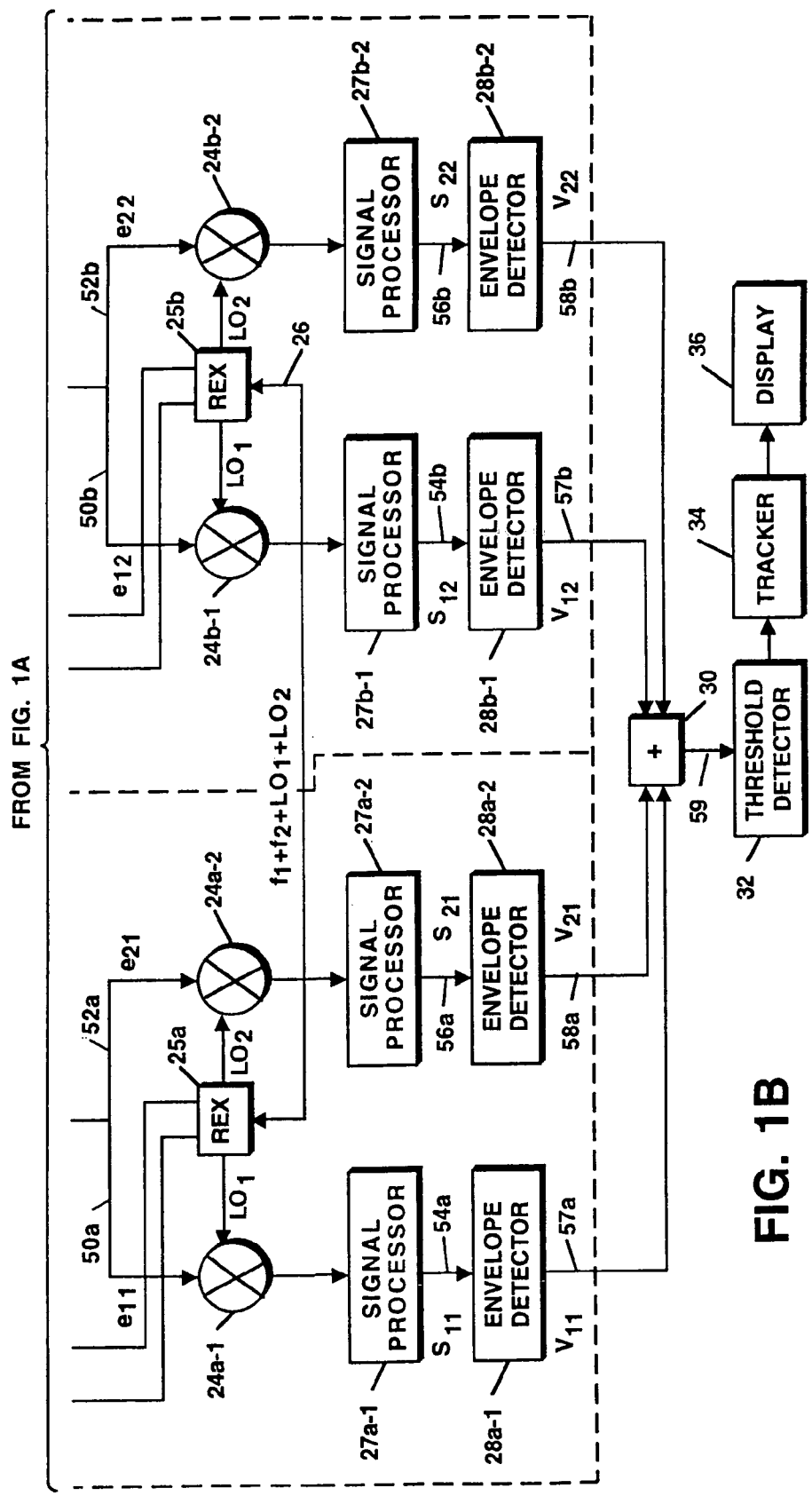
Figure 2:
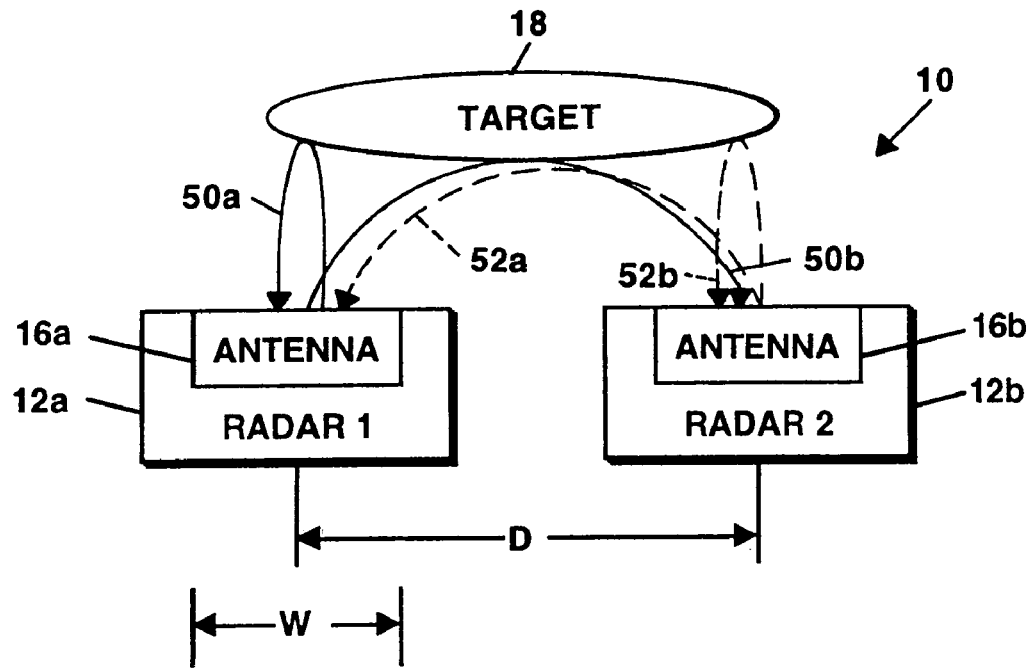
FIG. 2 is a conceptual depiction of the multi-radar combining system showing the paths of the transmit signal beams and corresponding echo signals for two radars.

Column 1,
Line 47, delete "FIGS. 1A and 1B taken together area" and replace with -- FIGS. 1A and 1B taken together are a --.

Column 3,
Lines 21, 23 and 26, delete "f, and $f_2$" and replace with -- $f_1$ and $f_2$ --.
Line 54, delete "integrated signals $V_{11}$ $157_a$," and replace with -- integrated signals $V_{11}$ $57_a$, --.

Column 4,
Line 4, delete "("$S_{22}$")" and replace with -- ("$S_2$") --.

Column 5,
Line 57, delete "threshold detect 32," and replace with -- threshold detector 32, --.
Line 60, delete "threshold detect," and replace with -- threshold detector, --.

Column 7,
Line 39, delete "receiving, in the second radar" and replace with -- receiving, in the second radar, --.

UNITED STATES PATENT AND TRADEMARK OFFICE
CERTIFICATE OF CORRECTION

PATENT NO. : 6,977,610 B2
APPLICATION NO. : 10/684081
DATED : December 20, 2005
INVENTOR(S) : Eli Brookner et al.

It is certified that error appears in the above-identified patent and that said Letters Patent is hereby corrected as shown below:

Column 8,
Line 4, delete "a transmitter which provide signals to and" and replace with
-- a transmitter which provides signals to a --.

Signed and Sealed this

Twenty-seventh Day of June, 2006

JON W. DUDAS
*Director of the United States Patent and Trademark Office*